(12) United States Patent
Liao (10) Patent No.: US 7,036,859 B1
(45) Date of Patent: May 2, 2006

(54) LIFTING DEVICE FOR POT OR PAN

(76) Inventor: Hung Chia Liao, P.O. Box 63-298, Taichung 40699 (TW)

( * ) Notice: Subject to any disclaimer, the term of this patent is extended or adjusted under 35 U.S.C. 154(b) by 0 days.

(21) Appl. No.: 11/113,383

(22) Filed: Apr. 25, 2005

(51) Int. Cl.
*A47J 45/10* (2006.01)

(52) U.S. Cl. ................................ 294/16; 294/31.1
(58) Field of Classification Search .............. 294/28, 294/29, 31.1, 3, 8.5, 11, 16, 106
See application file for complete search history.

(56) References Cited

U.S. PATENT DOCUMENTS

| | | | | |
|---|---|---|---|---|
| 982,354 A | * | 1/1911 | Easton | 294/28 |
| 1,051,374 A | | 1/1913 | Agin | |
| 1,212,822 A | * | 1/1917 | Schlepp | 294/28 |
| 1,330,487 A | * | 2/1920 | Mullen | 294/31.1 |
| 2,410,655 A | * | 11/1946 | Henrichon | 294/30 |
| 2,511,142 A | * | 6/1950 | Zwoboda et al. | 294/106 |
| 2,588,733 A | | 3/1952 | Knox | |
| 2,840,413 A | * | 6/1958 | Beihl | 294/31.1 |
| 6,092,847 A | * | 7/2000 | Kwan | 294/16 |

* cited by examiner

*Primary Examiner*—Dean J. Kramer
(74) *Attorney, Agent, or Firm*—Charles E. Baxley (57) ABSTRACT

A lifting device includes a pair of gripping jaws pivotally coupled together at one end with a pivot axle, to allow the gripping jaws to be rotated relative to each other, two locking members secured to the gripping jaws respectively, and a latching device for latching the locking members together, to secure the gripping jaws together at selected angular positions. The gripping jaws each may include two or more arms each having a prong or a bar for engaging with and for lifting objects. One of the locking members includes a finger having a number of teeth, and the other latching device includes a pivotal latch to selectively latch the locking members together.

12 Claims, 7 Drawing Sheets

LIFTING DEVICE FOR POT OR PAN

BACKGROUND OF THE INVENTION

1. Field of the Invention

The present invention relates to a lifting device for bottles, pans, pots, bowls, or the like, and more particularly to a lifting device having a positional locking device for locking the gripping arms in place.

2. Description of the Prior Art

Typical lifting or gripping or transporting devices comprise two gripping jaws or fingers pivotally coupled together, for engaging with and for gripping or lifting or transporting bottles, pans, pots, bowls, or the like.

For example, U.S. Pat. No. 1,051,374 to Agin discloses one of the typical lifting or gripping or transporting devices which also comprise two gripping jaws or fingers pivotally coupled together, for engaging with and for gripping or lifting or transporting bottles, pans, pots, bowls, or the like. The two gripping jaws or fingers pivotally coupled to a bar for being moved and operated by the bar. However, the gripping jaws or fingers may not be smoothly opened by moving the bar along an extension of a hollow staff.

U.S. Pat. No. 2,588,733 to Knox discloses another typical lifting or gripping or transporting device also comprising two gripping jaws or fingers pivotally coupled together, for engaging with and for gripping or lifting or transporting bottles, pans, pots, bowls, or the like. The gripping jaws or fingers are pivotally coupled to a vertical support for being moved and operated by the vertical support, and a spring-biased latch for positioning or locking the vertical support. However, the gripping jaws or fingers may not be widely opened.

The present invention has arisen to mitigate and/or obviate the afore-described disadvantages of the conventional lifting devices.

SUMMARY OF THE INVENTION

The primary objective of the present invention is to provide a lifting device including a positional locking device for locking the gripping arms in place and for preventing the gripping arms from being disengaged from the bottles, the pans, the pots, the bowls, or the like inadvertently.

In accordance with one aspect of the invention, there is provided a lifting device comprising a pair of gripping jaws pivotally coupled together at a first end with a pivot axle, to allow the gripping jaws to be rotated relative to each other, a first locking member and a second locking member secured to the first end of the gripping jaws respectively, and a latching device for latching the first and the second locking members together, to secure the gripping jaws together at selected angular positions.

The gripping jaws each includes two arms each having a second end for engaging with and for lifting objects. The gripping jaws each includes a bar secured between the arms, for engaging with the objects. The bars of the gripping jaws each includes a curved seating portion formed therein, for engaging with the objects. The gripping jaws each includes a prong provided on the second end of the arms for engaging with the objects.

The arms of the gripping jaws each includes a bifurcated intermediate portion formed thereon. The first and the second locking members each includes a hand grip provided thereon for operating the gripping jaws.

The second locking member includes a finger provided thereon, and the latching device includes a latch pivotally attached to the first locking member, to selectively latch the first and the second locking members together.

The second locking member includes a plurality of teeth provided on the finger thereof, and the latch includes at least one tooth provided thereon, for selectively engaging with the teeth of the second locking member. The finger of the second locking member is an annular finger having an opening formed therein.

The latch includes a first end pivotally secured to the first locking member, and includes a catch having the tooth formed therein. The latch includes a hand grip provided thereon for operating the latch.

The first locking member includes a channel formed therein for slidably receiving the finger of the second locking member. The first locking member includes a chamber formed therein for slidably receiving the latch.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–4, a lifting device in accordance with the present invention comprises a pair of gripping jaws 2, 3 each may include one or more, such as two fingers or arms 20, 30 pivotally coupled together at one end or upper end thereof with a pivot axle 10, to allow the fingers or arms 20, 30 to be rotated relative to each other, best shown in FIGS. 4 and 8–10.

Figure 5:
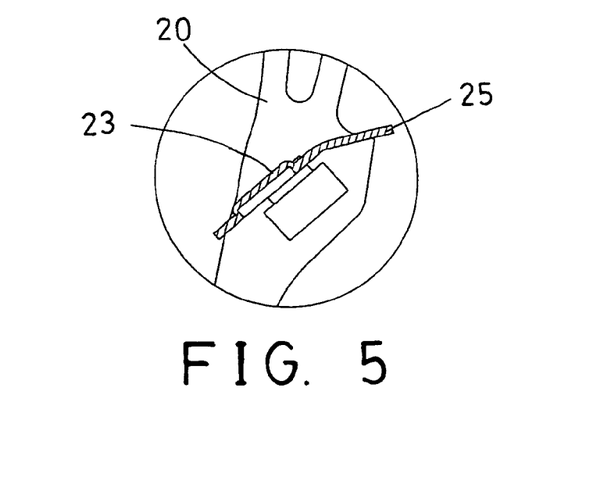
FIG. 5 is an enlarged partial plan view of the lifting device.
Figures 7, 10:
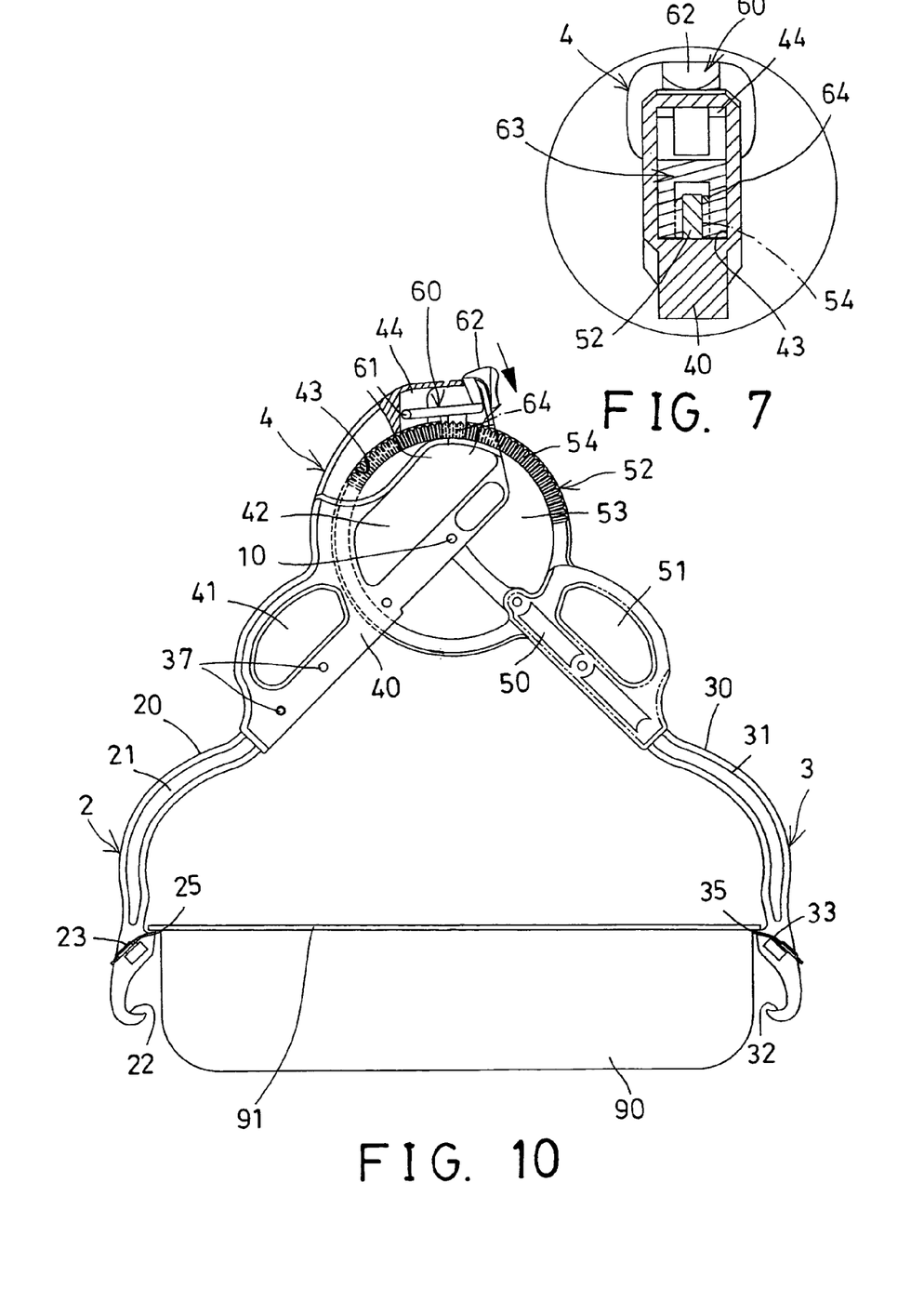
FIG. 7 is a partial cross sectional view similar to FIG. 6, illustrating the operation of the lifting device.
FIGS. 9 and 10 are plan views similar to FIG. 4, illustrating the operation of the lifting device.
Figure 8:
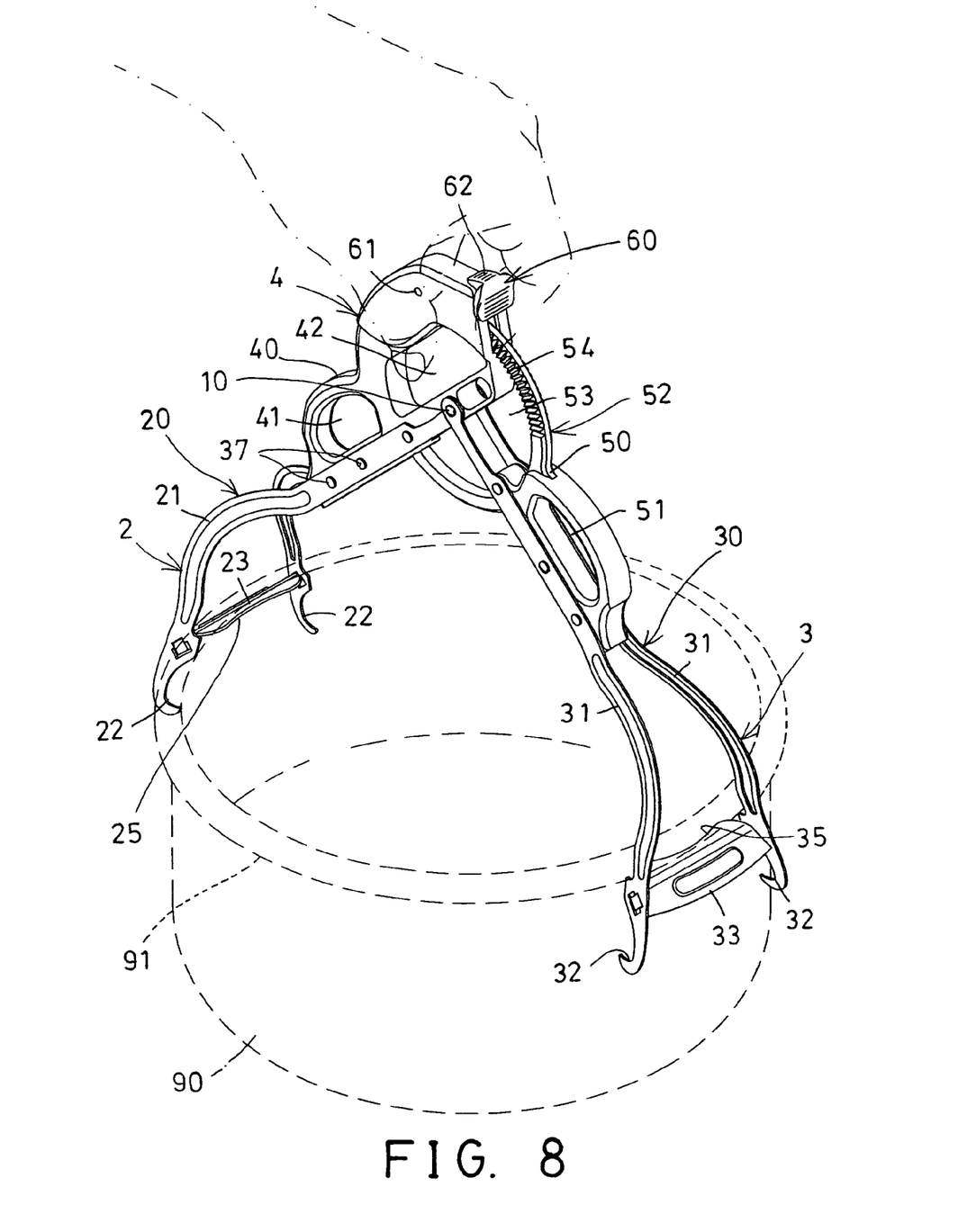
FIG. 8 is a perspective view illustrating the operation of the lifting device.
Figure 9:
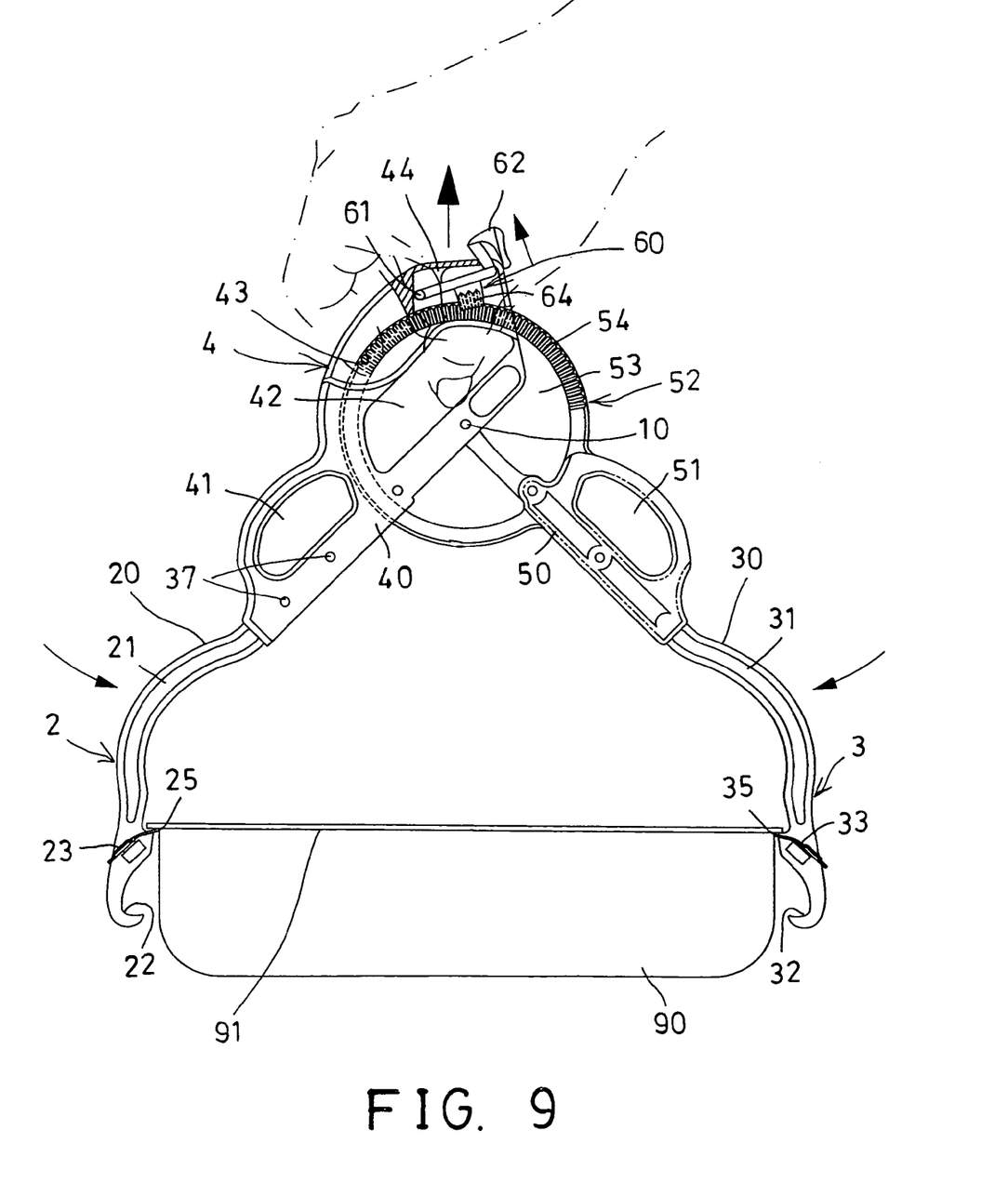

It is preferable that the gripping jaws 2, 3 each includes a bifurcated intermediate portion 21, 31 formed or provided on the arm 20, 30, and a prong 22, 32 formed or provided on the other end or the lower end on the arm 20, 30, for engaging with and for gripping or lifting or transporting objects 90, such as bottles, pans, pots 90, bowls, or the like (FIGS. 8–10). The gripping jaws 2, 3 each may further include a bar 23, 33 secured between the arm 20, 30 (FIGS. 1, 5) with such as locking ears 24, 34, and having a curved seating portion 25, 35 for suitably engaging with and supporting the curved outer peripheral portions 91 of the pots 90 or the like, best shown in FIG. 8.

A locking means or device 4 is further provided for locking the arm 20, 30 of the gripping jaws 2, 3 together at selected angular position, and for preventing the arms 20, 30 from being disengaged from the objects 90, the bottles, the pans, the pots 90, the bowls, or the like inadvertently. For example, the locking device 4 includes two locking members 40, 50 secured to the arms 20, 30, such as the upper portions of the arms 20, 30 with such as fasteners 37, and each having a handle portion 41, 51 for holding or handling or operating the locking members 40, 50 and thus the arm 20, 30 of the gripping jaws 2, 3.

The locking member 40 further includes an opening 42 formed therein, for such as holding or grasping or hanging purposes, and includes a curved channel 43 and a chamber 44 formed therein (FIGS. 4, 6–7 and 9–10). The other locking member 50 includes a peripheral or circular or curved finger 52 formed or provided or extended therefrom for slidably engaging into the curved channel 43 of the locking member 40. For example, the locking member 40 may includes two half members (not shown) that may be welded or secured together after the peripheral or circular or curved finger 52 of the other locking member 50 has been slidably engaged into the curved channel 43 of the locking member 40.

It is preferable that the locking member 50 further includes an opening 53 formed in the peripheral or circular or curved finger 52 thereof, for such as holding or grasping or hanging purposes, and includes a number of protrusions or teeth 54 formed or extended from the peripheral or circular or curved finger 52 thereof. The locking device 4 further includes a latch 60 slidably or rotatably received or engaged within the chamber 44 of the locking member 40, and having one end pivotally or rotatably secured to the locking member 40 with a pivot pin 61, and having a hand grip 62 formed or provided on the other end thereof for rotating or operating the latch 60 relative to the locking members 40, 50.

It is further preferable that the locking members 40, 50 are secured to the upper portions of the arms 20, 30 of the gripping jaws 2, 3, and are thus located opposite to the prong 22, 32 or the bar 23, 33 that are provided or attached to the other end or the lower end on the arms 20, 30, or the locking members 40, 50 and the prong 22, 32 or the bar 23, 33 of the gripping jaws 2, 3 are located on opposite sides of the pivot axle 10.

The latch 60 includes a catch 63 formed or extended from an intermediate portion thereof, and having one or more cavities or sockets or protrusions or teeth 64 formed or extended therefrom, for selectively engaging with the protrusions or teeth 54 of the peripheral or circular or curved finger 52 of the other locking member 50 (FIGS. 6–7 and 9–10), in order to selectively open or release the locking members 40, 50, or to selectively lock or anchor or position the locking members 40, 50 together at selected angular positions.

Figure 1:
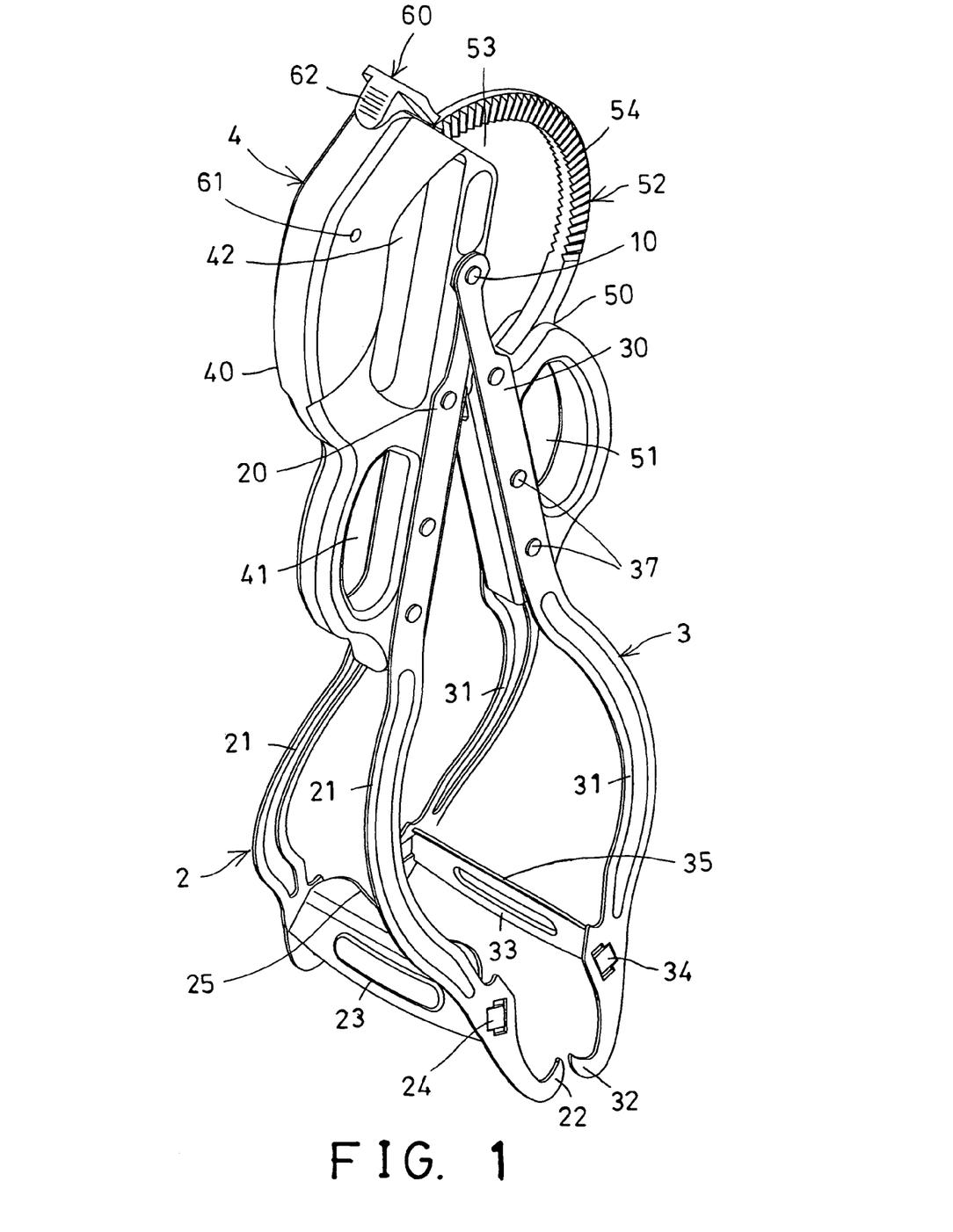
FIG. 1 is a perspective view of a lifting device in accordance with the present invention.
Figure 2:
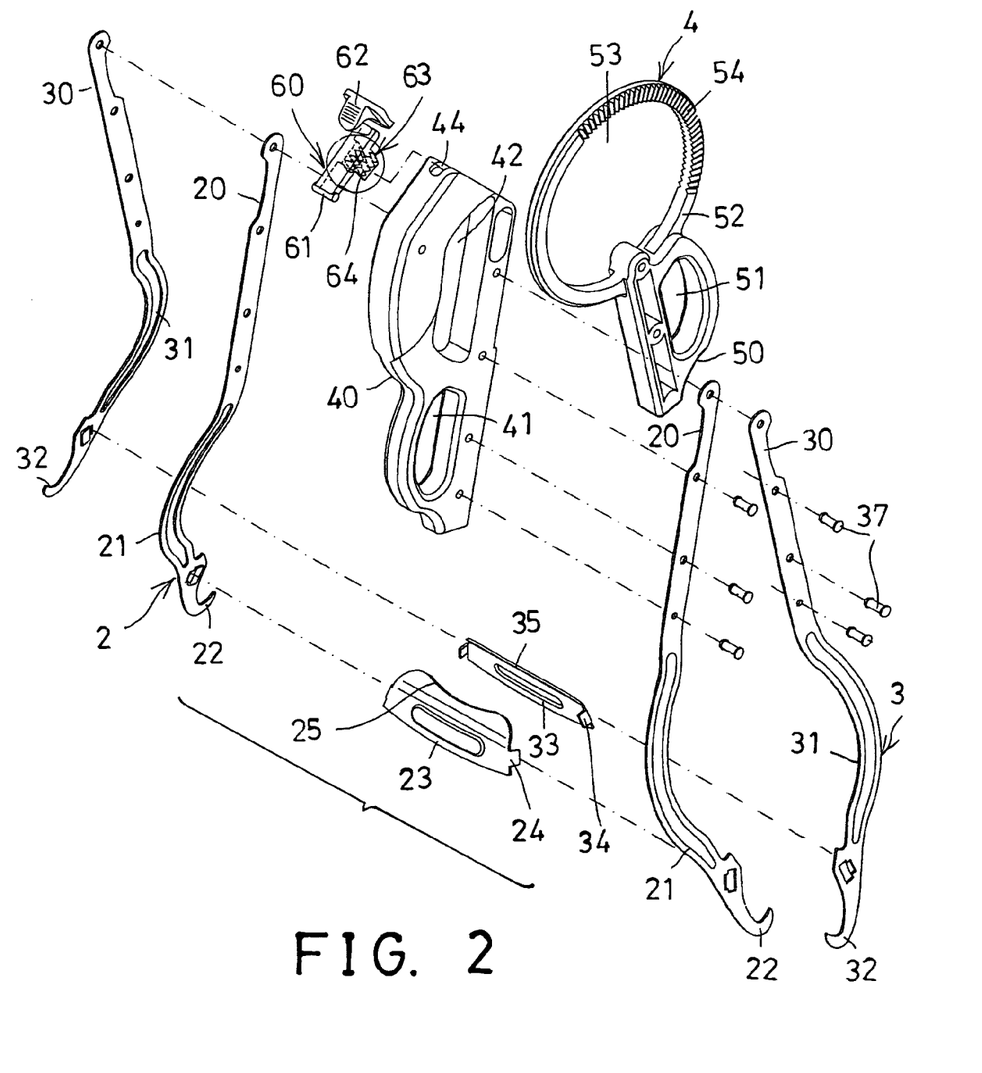
FIG. 2 is an exploded view of the lifting device.
Figure 3:
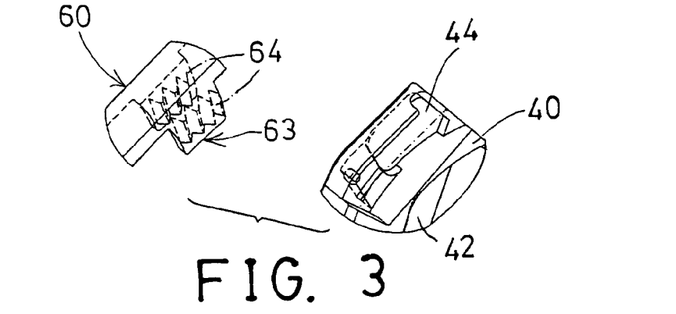
FIG. 3 is an enlarged partial exploded view of the lifting device.
Figure 4:
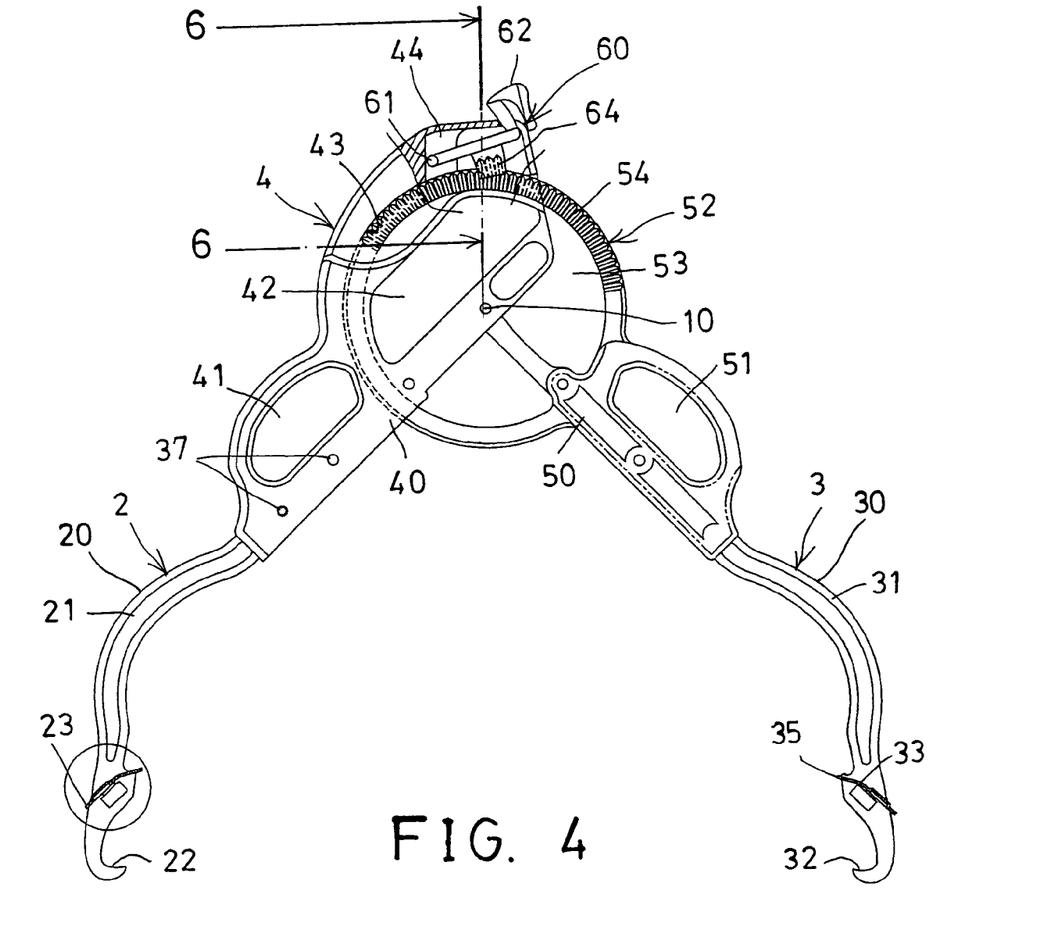
FIG. 4 is a plan view of the lifting device, in which a portion of the lifting device has been cut off for showing an inner structure of the lifting device.
Figure 6:
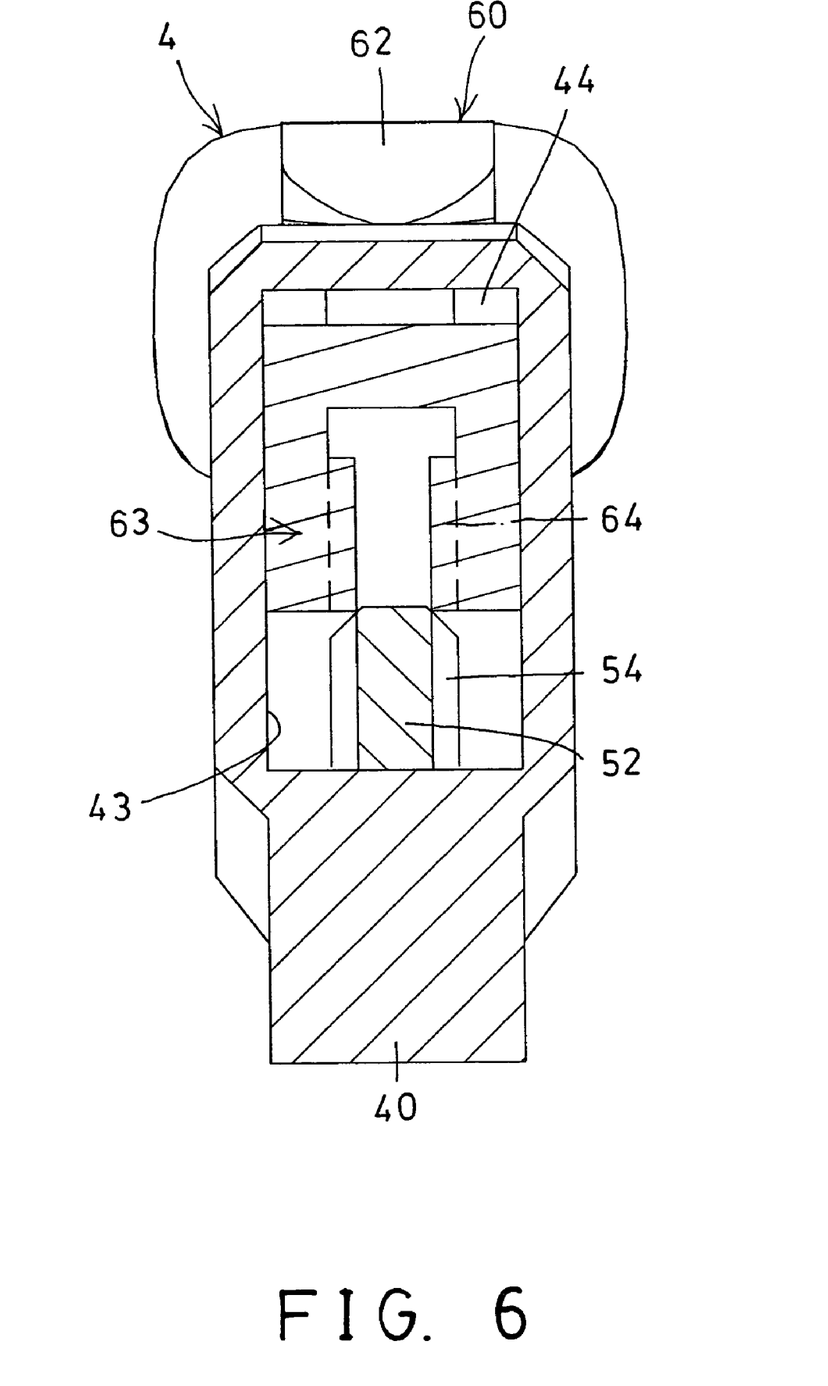
FIG. 6 is a partial cross sectional view of the lifting device, taken along lines 6—6 of FIG. 4.

In operation, as shown in FIGS. 4, 6, and 9, when the teeth 64 of the catch 63 of the latch 60 are disengaged from the teeth 54 of the peripheral or circular or curved finger 52 of the locking member 50, the locking members 40, 50 may be released relative to each other, to allow the fingers or arms 20, 30 to be rotated relative to each other about the pivot axle 10, and thus to allow the fingers or arms 20, 30 to be opened and to engage with and to grasp or to grip the curved outer peripheral portions 91 of the pots 90 or the like. The arms 20, 30 may be engaged with or may grasp or grip the curved outer peripheral portions 91 of the pots 90 or the like due to gravitational force.

However, in some circumstances, or when hot food or soup or materials are received within the pots 90 or the like, it is preferable that the arms 20, 30 of the gripping jaws 2, 3 are locked or secured together, to prevent the arms 20, 30 from being opened relative to each other, and to prevent the hot food or soup or materials from hurting people. In order to lock the arms 20, 30 of the gripping jaws 2, 3 together, the latch 60 is rotated relative to the locking members 40, 50, to engage the teeth 64 of the catch 63 of the latch 60 with the teeth 54 of the circular or curved finger 52 of the locking member 50, and to selectively lock or anchor or position the locking members 40, 50 together at the selected angular positions, and thus to solidly engage the arms 20, 30 with the pots 90, and to prevent the arms 20, 30 from being disengaged from the pots 90 inadvertently. The latch 60 may thus be used as a latching means or device for selectively latching and locking and positioning the locking members 40, 50 together.

The locking members 40, 50 are secured to the upper portions of the arms 20, 30 of the gripping jaws 2, 3, opposite to the prong 22, 32 or the bar 23, 33 that are provided or attached to the other end or the lower end on the arms 20, 30, for allowing the locking members 40, 50 to be rotated in concert with the arms 20, 30 of the gripping jaws 2, 3, and for allowing the latch 60 to be easily operated or rotated relative to the locking members 40, 50, and to easily engage the teeth 64 of the catch 63 with the teeth 54 of the circular or curved finger 52 of the locking member 50, and thus to easily and effectively lock or anchor or position the locking members 40, 50 and thus the arms 20, 30 of the gripping jaws 2, 3 together.

Accordingly, the lifting device in accordance with the present invention includes a positional locking device for locking the gripping arms in place and for preventing the gripping arms from being disengaged from the bottles, the pans, the pots, the bowls, or the like inadvertently.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lifting device comprising:
    a pair of gripping jaws pivotally coupled together at a first end with a pivot axle, to allow said gripping jaws to be rotated relative to each other,
    a first locking member and a second locking member secured to said first end of said gripping jaws respectively, said second locking member including a finger provided thereon and said finger of said second locking member being an annular finger having an opening formed therein, and
    means for latching said first and said second locking members together, to secure said gripping jaws together at selected angular positions, and said latching means including a latch pivotally attached to said first locking member, to selectively latch said first and said second locking members together.

2. The lifting device as claimed in claim 1, wherein said gripping jaws each includes two arms each having a second end for engaging with and for lifting objects.

3. The lifting device as claimed in claim 2, wherein said gripping jaws each includes a bar secured between said arms, for engaging with the objects.

4. The lifting device as claimed in claim 3, wherein said bars of said gripping jaws each includes a curved seating portion formed therein, for engaging with the objects.

5. The lifting device as claimed in claim 2, wherein said gripping jaws each includes a prong provided on said second end of said arms for engaging with the objects.

6. The lifting device as claimed in claim 2, wherein said arms of said gripping jaws each includes a bifurcated intermediate portion formed thereon.

7. The lifting device as claimed in claim 1, wherein said first and said second locking members each includes a hand grip provided thereon for operating said gripping jaws.

8. The lifting device as claimed in claim 1, wherein said second locking member includes a plurality of teeth provided on said finger thereof, and said latch includes at least one tooth provided thereon, for selectively engaging with said teeth of said second locking member.

9. The lifting device as claimed in claim 8, wherein said latch includes a first end pivotally secured to said first locking member, and includes a catch having said at least one tooth formed therein.

10. The lifting device as claimed in claim 9, wherein said latch includes a hand grip provided thereon for operating said latch.

11. The lifting device as claimed in claim 1, wherein said first locking member includes a channel formed therein for slidably receiving said finger of said second locking member.

12. The lifting device as claimed in claim 1, wherein said first locking member includes a chamber formed therein for slidably receiving said latch.

* * * * *